G. H. F. HOLY.
RESILIENT DRIVING CONNECTION.
APPLICATION FILED DEC. 29, 1915.

1,275,029.

Patented Aug. 6, 1918.

WITNESSES:
Fred. A. Lind.
W.C.McCoy.

INVENTOR
George H. F. Holy
BY
Wesley S. Carr
ATTORNEY

UNITED STATES PATENT OFFICE.

GEORGE H. F. HOLY, OF PITTSBURGH, PENNSYLVANIA, ASSIGNOR TO WESTINGHOUSE ELECTRIC AND MANUFACTURING COMPANY, A CORPORATION OF PENNSYLVANIA.

RESILIENT DRIVING CONNECTION.

1,275,029.　　　　Specification of Letters Patent.　　Patented Aug. 6, 1918.

Application filed December 29, 1915. Serial No. 69,199.

*To all whom it may concern:*

Be it known that I, GEORGE H. F. HOLY, a citizen of the United States, and a resident of Pittsburgh, in the county of Allegheny and State of Pennsylvania, have invented a new and useful Improvement in Resilient Driving Connections, of which the following is a specification.

My invention relates to means for resiliently and operatively connecting two members and particularly to such means as are interposed between the driving wheels and the rotatable members of the propelling units for railway vehicles and the like.

One object of my invention is to provide a resilient connection of the above-specified class which shall comprise a minimum number of parts, be inexpensive to construct and be reliable in operation.

Another object of my invention is to provide a driving connection that will insure a uniform application of pressure across the face of the driving pinion.

A further object of my invention is to provide a resilient connection of the class under consideration which will properly distribute the load between the propelling units.

Another object of my invention is to provide a flexible driving connection which will tend to cushion shocks or blows caused by sudden changes in the angular velocity of the rotating parts of the locomotive or other vehicles.

Resilient connections that have heretofore been proposed have embodied a plurality of separable resilient members.

My invention provides a means whereby sufficient resiliency for practical purposes may be provided in the driving shafts of the propelling units. In brief, my invention provides an auxiliary—preferably hollow—shaft for supporting the "dead load" and end thrust of the propelling units, and a main shaft, of smaller cross-section and relatively longer length between mounted points, for transmitting the driving torque to the motor pinions.

Figure 2:
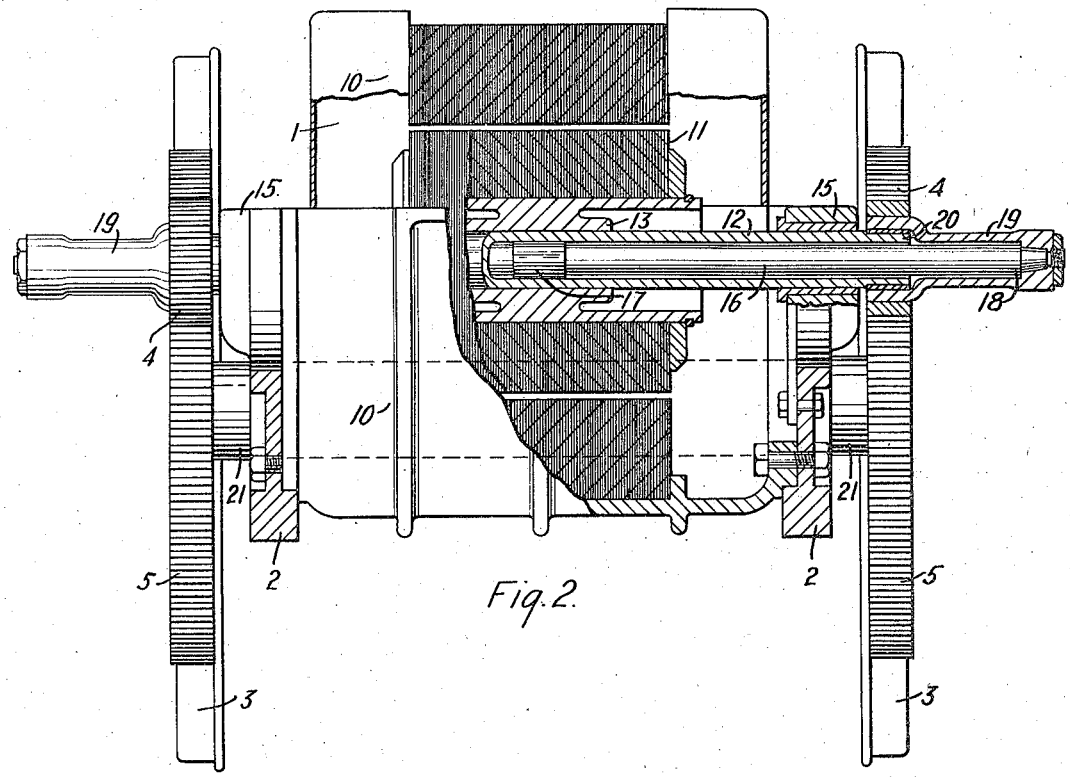
Figure 1:
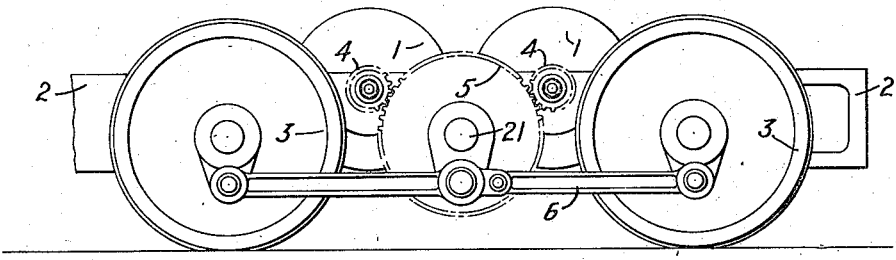

Figure 1 of the accompanying drawing is a side elevational view of a locomotive truck embodying my invention; and Fig. 2 is an enlarged end view, partially in section and partially in elevation, of a portion of the locomotive truck shown in Fig. 1.

The locomotive truck shown in Fig. 1 comprises a plurality of propelling units 1 that are supported by side frames 2 and are operatively and mechanically connected to a plurality of driving wheels 3 by means of interposed pinions 4, a jack-shaft gear wheel 5 and side connecting rods 6.

Referring particularly to Fig. 2 of the drawing, the motor 1 comprises a stator 10 which is rigidly supported by the side frames 3 and a rotor 11 which is rigidly mounted upon a hollow shaft 12 by means of an interposed spider member 13. The hollow shaft 12 is rotatably mounted in the bearings 15, and a smaller shaft 16 is disposed within the hollow shaft 12 and is rigidly secured thereto over a portion 17 of its length. The end 18 of the shaft 16 is provided with a sleeve member 19 that is rigidly secured thereto and is rotatably mounted upon the end 20 of the hollow shaft 12. The sleeve member 19 is provided with a pinion 4 that is secured thereto and is adapted to coöperate with the jack-shaft gear wheel 5.

The operation of such a connection as I have described may be set forth as follows: when power is applied to the driving unit 1, the rotative effort produced tends to move the rotor member 11 independently of the pinion 4, by reason of the torsional straining of the shaft 16 produced by this suddenly applied stress. The torsional straining of the shaft 16 will continue until the strain produced therein opposes further relative movement of the rotor 11 and the pinion 4, whereupon the pinion 4 will be rotatively actuated.

It will readily be seen that the hollow shaft 12 supports what may be termed the "dead load" and the end thrust of the driving units and thereby relieves the inner shaft 16 of all but the torsional stress that is required to transmit the driving torque from the propelling unit to the driving pinion.

The inner shaft 16 may, therefore, have a much smaller cross-section than a single solid shaft would have, to transmit the same rotative effort with the same stress intensity. The strain produced in the smaller shaft is much greater than that of a single solid shaft and any desired degree of resiliency may be obtained, without decreasing the torsional stress which the shaft will stand, by changing the length of the sleeve member 19 and thereby changing the length of the inner driving shaft 16.

The flexibility of the power-transmitting shaft 16 and the rigidity of the hollow supporting shaft 12, upon which the sleeve member 19 is rotatively mounted, will insure the proper alinement and intermeshing of the driving pinion 4 with the driven gear 5 by reason of the angular movements permitted between the axes of the supporting shaft 12 and the sleeve member 19.

In the usual form of twin-pinion drive, the jack-shaft gear wheels are rigidly mounted upon a shaft, and a form of resilient connection is interposed between the jack-shaft 5 and the driving wheels 3. It will readily be understood that, with the two pinions 4 secured to a rigid shaft, any slight misalinement, between either the geared jack-shaft wheels 5 or the pinions 4, will result in a large unbalancing of the load on the several pinions. In the connection herein described, the torsional flexibility of the inner shaft 16 insures a proper distribution of load between the pinions 4, as will be readily understood.

Although I have shown the above-described flexible connection as applied to a twin-pinion construction, it should be understood that any suitable combination of single pinions may be used.

I do not wish to be restricted to the specific structural details herein set forth since various modifications thereof may be effected without departing from the spirit and scope of my invention, and I desire, therefore, that only such limitations shall be imposed as are indicated in the appended claims.

I claim as my invention:

1. The combination with a driving and a driven member, of means comprising a hollow shaft and a shaft disposed within said hollow shaft for resiliently connecting said driving and driven members together.

2. The combination with a driving member and a main shaft connected thereto, of a pinion rotatably supported by said shaft and means comprising a resilient shaft for connecting the pinion to said main shaft.

3. A resilient connection comprising a hollow shaft, a shaft disposed within said hollow shaft and secured thereto, and a sleeve member secured to the inner shaft and rotatably associated with the hollow shaft.

4. A resilient connection comprising a hollow shaft, a shaft disposed within said hollow shaft and secured thereto, and a sleeve member secured to the inner shaft and rotatably mounted upon the hollow shaft.

5. The combination with a driving and a driven member, of a hollow shaft, a shaft disposed within said hollow shaft, and a pinion that is secured to the inner shaft and rotatably associated with the hollow shaft.

6. A driving connection comprising a rotatably mounted hollow shaft, a shaft disposed within the hollow shaft and having one end secured thereto, a sleeve member one end of which is secured to the other end of the inner shaft and the other end of which is rotatably associated with the hollow shaft, and a pinion secured to said sleeve member.

7. A driving connection comprising a rotatably mounted hollow shaft, a shaft mounted within the hollow shaft and secured thereto, a sleeve member one end of which is secured to one end of the inner shaft and the other end of which is rotatably mounted upon said hollow shaft, and a pinion secured to said sleeve member.

8. The combination of a rotatably mounted hollow shaft, a shaft rigidly mounted within the hollow shaft intermediate the ends thereof, a sleeve member one end of which is rigidly mounted upon one end of the inner shaft and the other end of which is rotatably associated with one end of the hollow shaft, and a pinion secured to said sleeve member.

9. The combination with a driving member and a hollow shaft connected thereto, of a driven member and resilient means comprising an auxiliary shaft for connecting said driven member to said shaft which shall permit of relatively angular movements between the axes of rotation of the hollow shaft and the driven member.

10. The combination with an electric motor, of a rotatably mounted hollow shaft upon which is secured a rotor member of said motor, a shaft disposed within said hollow shaft and secured thereto at a point intermediate the ends thereof, a sleeve member one end of which is secured to one end of said inner shaft and the other end of which is rotatably mounted upon said hollow shaft, and a pinion on said sleeve member.

11. The combination with an electric motor, of a rotatably-mounted hollow shaft, a shaft disposed within said hollow shaft and secured thereto at a point intermediate the ends thereof, two similarly-mounted sleeve members, and a pinion mounted upon each of the sleeve members; one end of one of the sleeve members being rigidly mounted upon one end of the inner shaft and the other end of the sleeve member being rotatably mounted upon one end of the hollow shaft.

12. In an electric locomotive, the combination with a driving member and driven members, of means comprising a resilient shaft for connecting the driving member to the driven members, the opposite ends of said shaft being mechanically connected to said driven members.

13. In an electric locomotive, the combination with a propelling motor and a plurality of driving wheels, of means comprising a resilient shaft connected intermediate its ends to said motor for transmitting the driving effort of the motor to the driving wheels.

14. In an electric locomotive, the combination with a driving and a driven member, of means for connecting said driving and said driven members together, said means comprising a hollow shaft connected to said driven member and an auxiliary shaft rigidly joined to said hollow shaft.

In testimony whereof I have hereunto subscribed my name this 13th day of December, 1915.

GEORGE H. F. HOLY.